No. 888,421. PATENTED MAY 19, 1908.
E. CAPITAINE.
METHOD OF MAINTAINING A CONSTANT OR APPROXIMATELY CONSTANT
TEMPERATURE IN A GAS PRODUCER.
APPLICATION FILED APR. 6, 1906.
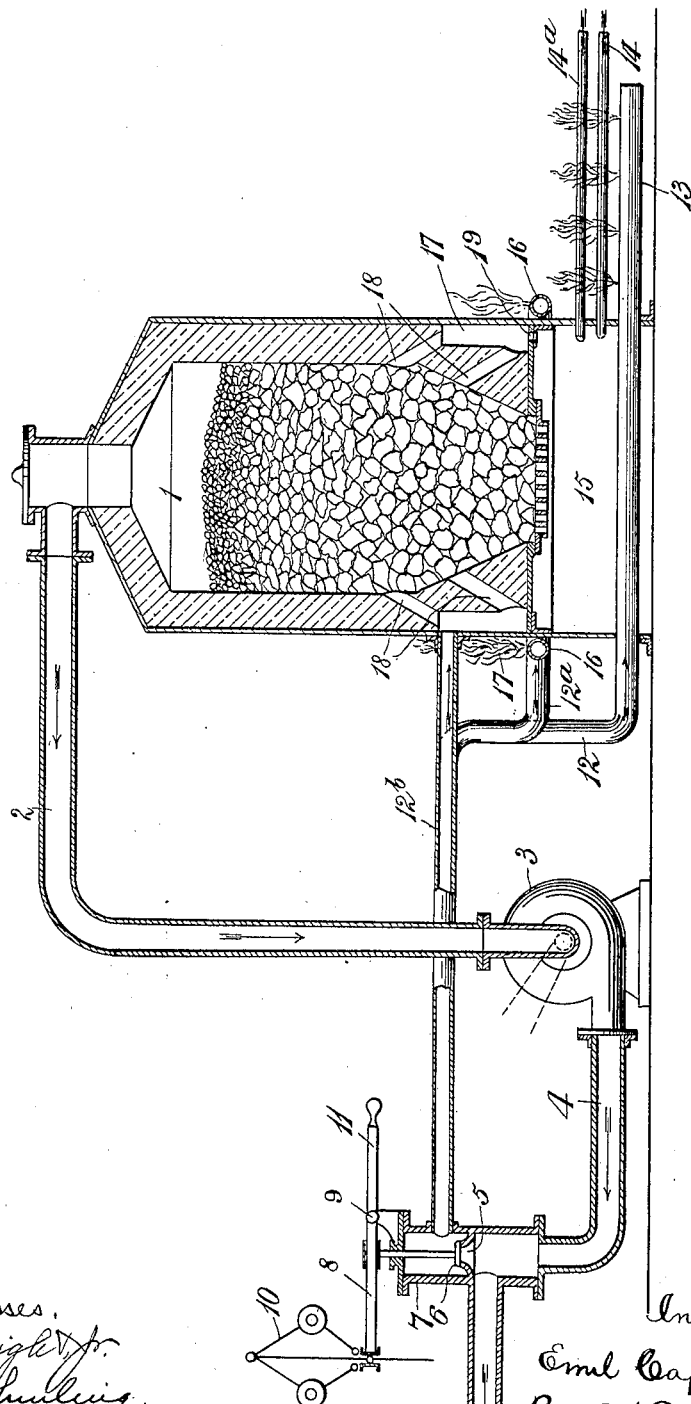

UNITED STATES PATENT OFFICE.

EMIL CAPITAINE, OF REISHOLZ, NEAR DUSSELDORF, GERMANY.

METHOD OF MAINTAINING A CONSTANT OR APPROXIMATELY CONSTANT TEMPERATURE IN A GAS-PRODUCER.

No. 888,421.  Specification of Letters Patent.  Patented May 19, 1908.

Original application filed March 27, 1905, Serial No. 252,350. Divided and this application filed April 6, 1906.
Serial No. 310,377.

*To all whom it may concern:*

Be it known that I, EMIL CAPITAINE, a subject of the Emperor of Germany, residing at Reisholz, near Dusseldorf, Germany, have invented a method of maintaining a constant or approximately constant temperature in a suction gas-producer with a varying consumption of gas, of which the following is a specification.

This invention has reference to suction gas producer engine plants that are repeatedly subjected to a greatly varying load, and it has for its object to avoid in a better manner than heretofore proposed, a drawback that usually occurs in such plants under the conditions mentioned, and which is due to the fact that the great reduction in the quantities of gas sucked off from the gas producer by the engine during times of light load, causes an undue reduction of the temperature in that part of the producer where the gas is generated, and consequently a reduction in the calorific value of the gas, with the result that there will be a reduction in the efficiency of the engine when the same is subsequently subjected to full load.

Now, according to the present invention, the temperature in the gas producer is maintained at a uniform or approximately uniform height with decreasing load on the engine, equivalent to the maintenance of the so-called condition of permanency in the gas producer, by causing, during reduction of the load, a larger or smaller quantity of gas, according as the degree in the reduction of load may require, but sufficient for the purpose above mentioned, to be sucked from the gas producer by a pump or exhauster and burning more or less of such gas according to circumstances, in such a way that some of the heat of combustion thereof will be utilized to assist in maintaining the temperature of the gas producer at the required degree.

In carrying out this invention, there is employed apparatus forming the subject of another application for Letters Patent dated 27th March 1905 Serial No. 252350, of which the present application is a division. In this apparatus, the pipe or passage for conveying gas from the gas producer to the engine is provided at a point between the exhauster and the engine with a gas outlet controlled by a valve that can be opened more or less by hand, or by a governor, so as to allow a greater or smaller quantity of gas to flow from the gas producer to the place where it is to be burned for maintaining the heat of such gas producer. The arrangement is such that as soon as the engine is relieved from load up to a predetermined amount at which the consumption of gas therein decreases in suchwise that the temperature in the gas producer begins to fall, a certain quantity of gas withdrawn from the producer by the exhauster will be allowed to escape from the gas pipe or passage to the place where it is to be burned and the heat of combustion utilized to maintain the temperature of the gas producer.

Usually only a small quantity of gas will be necessary, by its combustion, to keep the temperature in the gas generator at a suitable degree. The heat of combustion of the gas that is burned can be conveyed to the gas producer in many ways, for instance by providing in proximity to the fuel chamber wherein the gas is produced, heating surfaces over which the hot gaseous products of combustion can pass and which can be used to heat the air, or mixture of air and steam, that is supplied to the gas generator; or the gas generator can be heated from the outside by the heat of the burning gas, or by burning the gas in passages in the wall of the producer, so as to prevent or retard loss of heat from the producer by radiation and external cooling during the periods of light load; or the surplus gas may be blown direct into the gas generator and be burned therein. The quantity of the gas that is thus drawn off, burned and utilized to assist in heating the gas generator will vary according as the load of the engine is more or less reduced. The engine may continue to run even when relieved of load. The temperature of the gas producer may be maintained in the manner described when the engine is at rest. In this case the exhauster must be driven by means independent of the engine.

The accompanying drawing shows partly in vertical section and partly in side elevation, and more or less diagrammatically, a suction gas producer suitable for carrying out the present invention.

1 is the suction gas producer provided with a suction outlet pipe 2 in connection with a gas exhauster 3 arranged to deliver the gas drawn from the producer 1 into a pipe 4 whence it passes to the gas engine, not shown. In the pipe 4 is a gas outlet port 5 controlled by a valve 6 that is arranged in a valve case 7 and connected to a lever 8 pivoted at 9 and adapted to be automatically operated by a centrifugal governor 10 driven from the engine, and also, it may be, to be operated by hand through a hand lever 11. 12, 12$^a$, 12$^b$ are pipes connected to the valve box 7 above the gas exit valve 6 and by means of them the gas allowed to escape from the pipe 4 past the valve 6 can be conducted to the place where it is to be burned. The pipe 12 may conduct the surplus gas to a burner 13 where it is burned and the resulting heat of combustion used to heat the air and steam passing through the pipes 14 and 14$^a$ respectively to the ash box 15 of the gas producer 1 so that some of such heat of combustion will be conveyed by the air and steam into the mass of fuel in the gas producer for maintaining the temperature thereof. Or the pipe 12$^a$ may conduct the surplus gas to a burner 16 surrounding the exterior of the wall of the gas producer so that the heat of combustion of such gas will heat the producer externally to prevent or retard radiation of heat from and external cooling of such gas producer. Or, the pipe 12$^b$ may be connected to an annular chamber 17 that surrounds the lower part of the gas producer and is in communication with passages 18 formed in the wall of the gas producer, and with the ash box 15 by openings 19 through which some of the air and steam admitted to the ash box by the pipes 14 and 14$^a$ can pass to the chamber 17 for effecting the combustion of the gas admitted thereto, the resulting flame and hot gases heating the lower part of the wall of the producer externally and escaping through the passages 18 into the producer around the fuel therein, so as to assist in maintaining the temperature thereof and heat the inner surface of the wall of the producer. Or the openings 19 may in some cases be omitted, in which case, the gas delivered into the chamber 17 will pass into the gas producer where it will be burned in contact with the inner surface of the wall of the producer for maintaining the temperature of the fuel. Pilot flames or other gas igniting devices are provided where necessary for automatically igniting the gas delivered by the pipe 12, 12$^a$ or 12$^b$.

The operation is as follows:—When the load on the engine is reduced below a predetermined amount, the gas exit valve 6 is opened, more or less, either automatically by the governor 10, or by the hand lever 11, and some of the gas drawn off from the gas producer by the exhauster 3 and delivered into the pipe 4 is allowed to escape by the pipe 12, 12$^a$ or 12$^b$ or two or all of such pipes to the place or places where it is to be burned, and there ignited, the heat of combustion being conveyed to the gas producer in one or more or all of the ways hereinbefore described.

It will be evident that the details of construction can be varied, and that various changes can be made in the construction of the suction gas producer plant hereinbefore described without departing from the spirit and scope of the invention so long as the relative arrangement of the main parts of the apparatus, or the mode of operation described, is preserved.

What I claim is:—

1. The method of maintaining a constant or approximately constant temperature in a suction gas producer working with a varying consumption of gas, due to varying load on the engine to which the gas is supplied, by causing a greater or smaller proportion of the gas drawn off from the gas generator to be delivered during periods when the engine is running with a reduced load, or with no load, to a place where it is burned, and transmitting heat resulting from its combustion to the gas generator.

2. The method of maintaining a constant or approximately constant temperature in a suction gas producer working with a varying consumption of gas, due to varying load on the engine to which the gas is supplied, said method consisting in causing a greater or smaller proportion of the gas drawn off from the gas generator to be delivered during periods when the engine is running with a reduced load, or with no load, to a place where it is burned, and utilizing some of the heat of combustion of such gas to heat the wall of the gas producer.

3. The method of maintaining a constant or approximately constant temperature in a suction gas producer working with a varying consumption of gas, due to varying load on the engine to which the gas is supplied, said method consisting in causing a greater or smaller proportion of the gas drawn off from the gas generator to be delivered during periods when the engine is running with a reduced load, or with no load, to a place where it is burned, and utilizing some of the heat of combustion to heat the gas producer externally.

Signed at Dusseldorf, Germany this twenty-third day of March 1906.

EMIL CAPITAINE.

Witnesses:
  WILLIAM ESSENWEIN,
  PETER LIEBER.